(12) United States Patent
Oliva et al.

(10) Patent No.: US 9,607,125 B1
(45) Date of Patent: Mar. 28, 2017

(54) CONTEXT-AWARE RELIABILITY CHECKS

(71) Applicant: Apple Inc., Cupertino, CA (US)

(72) Inventors: Antonietta Oliva, San Jose, CA (US); Karthik Rajagopal, Mountain View, CA (US); Manoj Gopalan, Milpitas, CA (US); Mini Nanua, Austin, TX (US); Sambasivan Narayan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 49 days.

(21) Appl. No.: 14/732,971

(22) Filed: Jun. 8, 2015

Related U.S. Application Data

(60) Provisional application No. 62/101,439, filed on Jan. 9, 2015.

(51) Int. Cl.
*G06F 17/50* (2006.01)

(52) U.S. Cl.
CPC .................. *G06F 17/5081* (2013.01)

(58) Field of Classification Search
CPC ................................. G06F 17/5081
USPC ................................. 716/111, 112
See application file for complete search history.

(56) References Cited

U.S. PATENT DOCUMENTS

| | | | | |
|---|---|---|---|---|
| 5,737,580 A * | 4/1998 | Hathaway et al. | . | G06F 17/5077 716/115 |
| 6,308,302 B1 * | 10/2001 | Hathaway et al. | . | G06F 17/5077 703/14 |
| 6,437,441 B1 * | 8/2002 | Yamamoto | ........ | H01L 21/76801 257/262 |
| 6,532,570 B1 * | 3/2003 | Mau | .................... | G06F 17/5036 716/130 |
| 6,578,178 B2 * | 6/2003 | Mau | .................... | G06F 17/5068 716/115 |
| 6,971,082 B2 * | 11/2005 | Shiratori | ............. | G06F 17/5077 716/115 |
| 7,752,582 B2 * | 7/2010 | Jain et al. | ........... | G06F 17/5036 716/107 |
| 7,857,959 B2 * | 12/2010 | Fourkas et al. | ........ | B82Y 25/00 205/118 |
| 8,219,953 B2 | 7/2012 | Jain et al. | | |
| 8,286,111 B2 | 10/2012 | Chandra et al. | | |
| 9,015,645 B1 * | 4/2015 | Pampati et al. | .... | G06F 17/5081 716/130 |
| 2008/0086708 A1 * | 4/2008 | Rittman | ............... | G06F 17/5081 716/52 |
| 2013/0298101 A1 | 11/2013 | Chandra | | |

* cited by examiner

*Primary Examiner* — Sun Lin
(74) *Attorney, Agent, or Firm* — Meyertons, Hood, Kivlin, Kowert & Goetzel, P.C.; Lawrence J. Merkel

(57) ABSTRACT

Embodiments of an electromigration (EM) check scheme to reduce a pessimism on current density limits by checking wire context. This methodology, in an embodiment, includes applying existing electronic design automation (EDA) flows and tools to identify potentially-failing wires based on a worst-case EM check using conservative foundry current density limits. A more accurate, context-specific check can be performed on the potentially-failing wires to eliminate one or more of the potentially-failing wires if those wires do not experience worst-case conditions and meet current density limits based on an actual context of those wires. A designer can correct remaining wires which are not eliminated by the context-specific check.

20 Claims, 3 Drawing Sheets

CONTEXT-AWARE RELIABILITY CHECKS

This application claims benefit of priority to U.S. Provisional Patent Application Ser. No. 62/101,439, filed Jan. 9, 2015. The provisional application is incorporated herein in its entirety. To the extent that anything in the provisional application conflicts with material expressly set forth herein, the material expressly set forth herein controls.

BACKGROUND

Technical Field

Embodiments described herein are related to reliability checking during the design of integrated circuits.

Description of the Related Art

Semiconducting chips, or integrated circuits, include a dense array of narrow, thin-film metallic conductors that serve to transport current between the various devices on the chip. These metallic conductors are called interconnects or "wires." Interconnects are subject to wear-out mechanisms over the lifetime of the product caused by, among other things, electromigration and Joule heating from current flowing through these wires. Healing effect may also be considered when checking for potential electromigration issues.

Electromigration is generally considered to be the result of momentum transfer during current flow from the electrons to the ions in the lattice of the interconnect material. The momentum transfer may cause the ions to move into the wires causing grain size change and wire resistance increase, as well as voids or hillocks that can cause opens or shorts in the wires. The opens and shorts generally lead to catastrophic failure of the integrated circuit. Interconnect wear out is a strong function of the wire temperature and average current through the wire. Higher temperatures correlate to faster interconnect failures (and thus shorter lifetimes for the integrated circuit). Similarly, higher currents correlate to faster interconnect failures. For this reason, based on expected operating temperature conditions, maximum current limits are followed in the design of the integrated circuit, in order to reduce failure from electromigration and thus provide for longer product lifetimes.

Joule heating is the process of the wire heating during current flow. This temperature rise due to Joule heating accelerates electromigration. Accordingly, Joule heating is also accounted for when checking the electromigration current limits (in addition to the expected operating temperature of the integrated circuit). The heat generated by a selected wire can also propagate to adjacent wires and increases the overall temperature of the chip. For this reason, current density is limited to reduce the amount of wire temperature rise and associated acceleration of electromigration. For example, a maximum budget for Joule heat may be established for a given integrated circuit, and the temperature rise due to the Joule heat is added to the expected operating temperature to determine the temperature to be used for electromigration checks.

AC currents may have symmetric current waveforms of both polarities (negative/positive). For A/C current waveforms, the electromigration damage due to the current in one direction may fully or mostly compensate for the opposite polarity current, assuming both polarities of currents occur at the same operating temperature (the "healing effect"). Accordingly, signal wires in digital circuits that have symmetric waveforms may not display significant electromigration but the amount of Joule heating can still be an issue. For example, integrated circuits that implement complementary metal-oxide-semiconductor (CMOS) technology have symmetrical currents from the positive power supply node to signal wires, and from the signal wires to ground. Power supply interconnects (e.g. $V_{DD}$ and $V_{SS}$, or ground) on the other hand, may have mostly unidirectional currents and are subject to both electromigration and Joule heating effects.

Due to continuing miniaturization of very large scale integrated (VLSI) circuits and the push for higher performance, interconnects are subject to increasing current densities. Accordingly, integrated circuit foundries (which manufacture the integrated circuits) provide guidelines for maximum currents to the integrated circuit designers. The maximum current guidelines account for electromigration and Joule heating. Electronic design automation (EDA) tools and flows are available for designers to ensure current limits meet requirements. Typically, separate design flows are run to check electromigration for power grid wires and signal wires as they are subject to different constraints.

If the current density limit is exceeded for a given wire, the designer makes changes to the wire to bring the current density within the limits. For example, the designer may increase the wire width of the give wire, or may reduce the amount of current through the given wire by reducing the current capacity of the circuitry driving the wire. Both these actions may have the side effect of reducing the performance and/or increasing the area of the design. Overly-conservative limits from the foundry may thus reduce performance and/or increase design effort and time.

EDA tools assume that the full temperature rise due to Joule heating is added to the product operating temperature to set the electromigration current density limits for the integrated circuit. This assumption is pessimistic: the entire chip temperature may not rise due to the Joule heating; but rather the temperature may increase only locally where the wire current is close to the limit. In addition, the amount of Joule heating of a selected wire is a strong function of the surrounding wires and current density flow in adjacent wires. The foundry guidelines are set on worst case configuration: multiple wires at minimum space carrying the worst case current density without metal running below and above. In these conditions, the wires may be subject to more severe temperature rise. If the worst case configuration does not accurately represent a given wire, the limit is pessimistic, causing unwarranted design effort, increasing area for the design on the integrated circuit, and increasing power consumption.

SUMMARY

Embodiments of the electromigration (EM) check scheme described herein may reduce the pessimism in the foundry-provided current density limits by checking the wire context and applying current limit relaxation where applicable. This methodology may leverage existing EDA flows and tools with the enhancement of the context aware algorithm and dynamic current limits adjustment. Particularly, the existing EDA flows and tools may be used to identify potentially-failing wires based on a worst-case EM check using the conservative foundry-supplied current density limits. A more accurate, context-specific check may be performed on the potentially-failing wires to eliminate one or more of the potentially-failing wires if those wires do not experience worst-case conditions and meet current density limits based on the actual context of the wire. The designer may correct the remaining wires which are not eliminated by the context-specific check. The number of wires which are modified in the design may be reduced, leading to a higher performance integrated circuit that still exhibits high reliability/reduced failure due to electromigration and/or Joule heating, in some embodiments.

BRIEF DESCRIPTION OF THE DRAWINGS

The following detailed description makes reference to the accompanying drawings, which are now briefly described.

Figure 1:
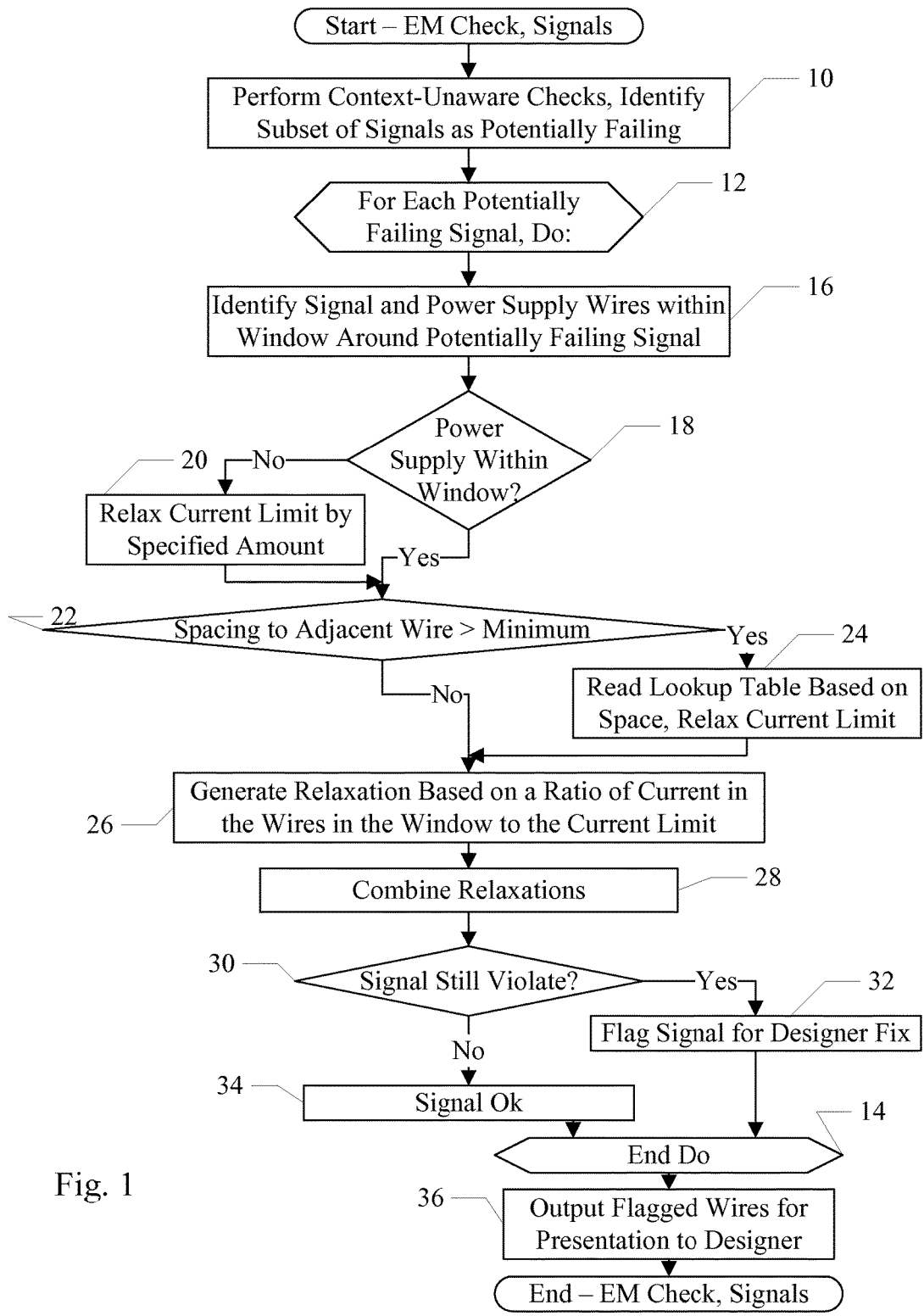
FIG. 1 is a flowchart illustrating operation of one embodiment of an EM checker for signal wires.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

FIG. 1 is a flowchart illustrating operation of one embodiment of an electromigration (EM) checker tool that may be included in the EDA tools/flows of an integrated circuit design methodology to check signal wires/interconnect for electromigration and Joule heating issues. The EM checker tool may be a standalone tool, or may be part of an EDA tool that performs various design checking/validation tasks. The EM checker tool may include instructions which, when executed by a processor in a computer system, implement the operation illustrated in FIG. 1. The EM checker tool may be configured to implement the operation shown in FIG. 1. While the blocks are shown in a particular order for ease of understanding, other orders may be used.

The EM checker tool may be configured to apply a context-unaware check of all signal wires in the integrated circuit design, or all the signal wires in a given block of the integrated circuit design (block 10). The context-unaware check may presume worst-case conditions for each wire. For example, the assumed conditions may be neighboring wires at minimum spacing carrying worst case currents and no metal above or below the wire. A subset of the signal wires may be identified as potentially failing based on the context-unaware check. The subset may include wires that actually do not fail because the worst case conditions do not apply. Wires not included in the subset, may have been filtered out by the context-unaware check and thus the more detailed analysis described below may be avoided for those signal wires outside the subset. The results of the EM checker tool may be more rapidly attained, in some embodiments, by performing a context-unaware check to filter out wires that pass the worst-case check.

For each potentially-failing signal wire, a more detailed analysis may be performed (illustrated as the blocks between the do loop initialization block 12 and the end do loop block 14 in FIG. 1). The EM checker tool may form a theoretical window of a predefined size around the potentially-failing signal wire (block 16). The predefined size may be determined from Joule heating dissipation considerations. That is, a wire that is outside the window, even if it may carry enough current to cause Joule heating, may dissipate enough that the effect on the potentially-failing wire is negligible.

If there is not a power supply interconnect within the window (decision block 18, "no" leg), the potential effects of currents in the power supply interconnect that were assumed in the worst case scenario may not apply. Accordingly, the current limit for the potentially-failing wire may be relaxed by a first amount (block 20). The first amount may be supplied by the foundry for the technology in which the integrated circuit will be manufactured. Relaxing the current limit may refer to increasing the limit applied to the potentially-failing wire, as compared to the current limit applied to wires in the worst-case, context-unaware analysis. If the spacing of the adjacent wires to the potentially-failing wire is greater than the minimum spacing (decision block 22, "yes" leg), a second amount of current limit relaxation may be applied by the EM checker tool (block 24). More particularly, a foundry-supplied lookup table of current limit based on wire spacing may be provided and the current limit (or second amount of relaxation) may be read from the lookup table and added to the current limit applied to the wire. Additionally, the EM checker tool may generate a third amount of relaxation based on a ratio of the current in wires within the window to the unadjusted current limit (or more) (block 26). For example, the relaxation may be based on the number of wires that exceed a ratio of the unadjusted current limit. The fewer wires that carry the ratio, the less heat they may generate and thus the less Joule heating they may contribute to the potentially failing signal wire. In an embodiment, the current limit can be relaxed up to three times the unadjusted current limit if there are no wires carrying the designated ratio. The ratio may also be supplied by the foundry based on the technology in which the integrated circuit is to be fabricated.

The EM checker tool may be configured to combine the first, second, and third relaxation amounts (if applicable) and the unadjusted current limit to generate an adjusted current limit (block 28), and may compare the adjusted current limit to the current in the potentially-failing signal wire. If the potentially-failing signal wire still fails the check against the adjusted current limit (decision block 30, "yes" leg), the signal wire may be flagged for the designer to correct (block 32). If the potentially-failing signal wire does not fail the check (decision block 30, "no" leg), the signal wire does not require correction (block 34). Each potentially-failing signal wire that is eliminated (decision block 30, "no" leg) may reduce the amount of work the designer performs for electromigration/Joule heating corrections in an embodiment. Additionally, performance and area impacts for unnecessary corrections may be eliminated, in an embodiment. The set of flagged wires may be output (e.g. in a file or other form that may be analyzed by the designer later) so that the designer may review the wires and provide the corrections to pass the EM checks (block 36).

Figure 2:
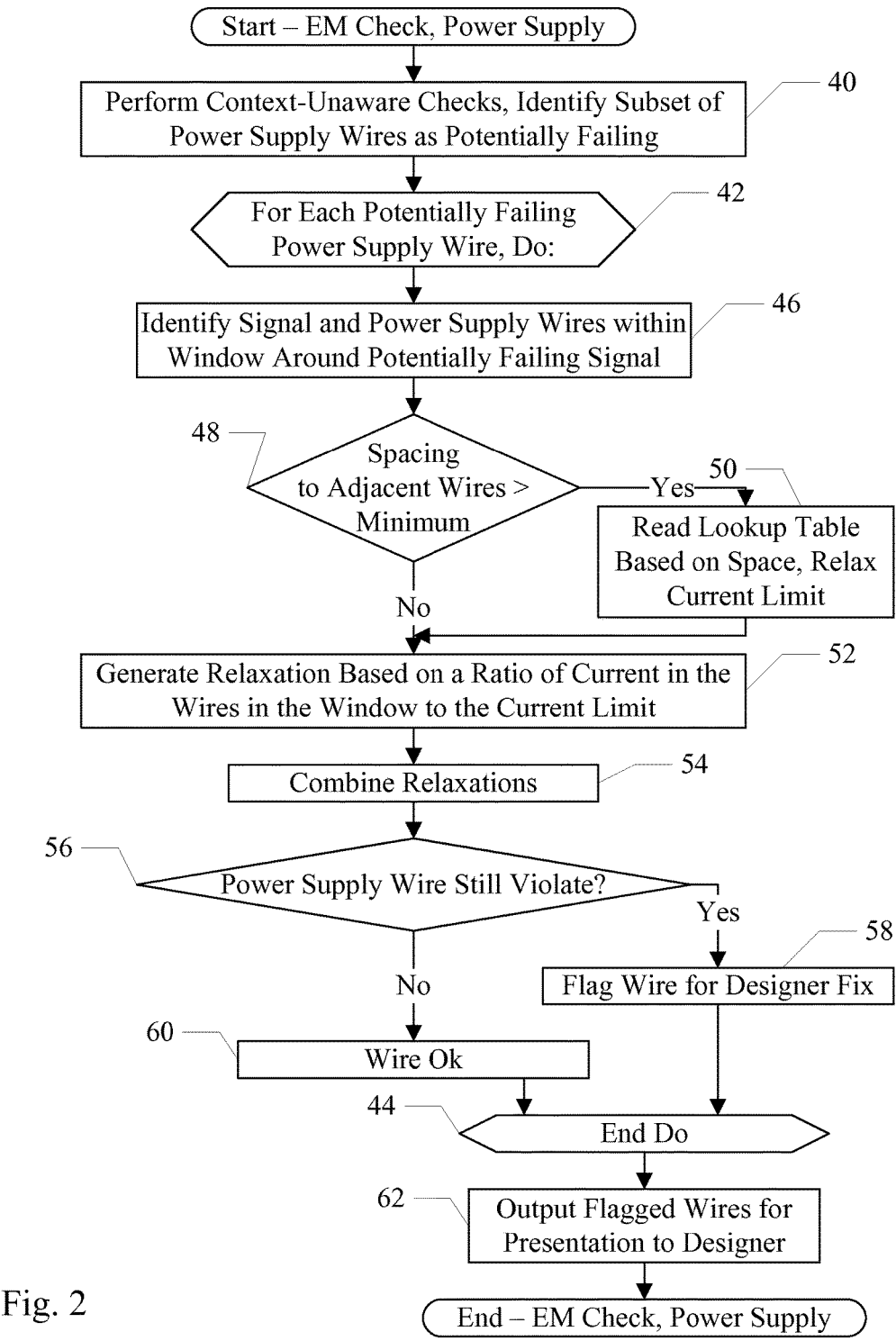
FIG. 2 is a flowchart illustrating operation of one embodiment of the EM checker for power supply wires.

FIG. 2 is a flowchart illustrating operation of one embodiment of the EM checker tool to check power supply wires/interconnect for electromigration and Joule heating issues. Power supply wires may include both power (e.g. $V_{DD}$) and ground (e.g. $V_{SS}$) wires. The EM checker tool may include instructions which, when executed by a processor in a computer system, implement the operation illustrated in FIG. 2. The EM checker tool may be configured to implement the operation shown in FIG. 2. While the blocks are shown in a particular order for ease of understanding, other orders may be used.

The EM checker tool may be configured to apply a context-unaware check of all power supply wires in the integrated circuit design, or all power supply wires in a given block of the integrated circuit design (block 40). The context-unaware check may presume worst-case conditions for each wire. A subset of the power supply wires may be identified as potentially failing based on the context-unaware check. The subset may include wires that actually do not fail because the worst case conditions do not apply. Wires not included in the subset may have been filtered out by the context-unaware check and thus the more detailed analysis described below may be avoided for those power supply wires outside the subset. The results of the EM checker tool may be more rapidly attained, in some embodiments, by performing a context-unaware check to filter out wires that pass the worst-case check.

For each potentially-failing power wire, a more detailed analysis may be performed (illustrated as the blocks between the do loop initialization block 42 and the end do loop block 44 in FIG. 2). The EM checker tool may form a theoretical window of a predefined size around the potentially-failing power supply wire (block 46). The predefined size may be determined from Joule heating dissipation considerations. That is, a wire that is outside the window, even if it may carry enough current to cause Joule heating, may dissipate enough that the effect on the potentially-failing wire is negligible.

If the spacing of the adjacent wires to the potentially-failing power wire is greater than the minimum spacing (decision block 48, "yes" leg), a first amount of current limit relaxation may be applied by the EM checker tool (block 50). More particularly, a foundry-supplied lookup table of current limit based on wire spacing may be provided and the current limit (or first amount of relaxation) may be read from the lookup table and added to the current limit applied to the wire. The EM checker tool may generate a second amount of relaxation generated based on a ratio of the current in the wires within the window that to the unadjusted current limit (or more) (block 52). For example, the number of wires that carry a ratio of the unadjusted current limit may be determined. The fewer wires that carry the ratio, the less heat they may generate and thus the less Joule heating they may contribute to the potentially failing power supply wire. In an embodiment, the current limit can be relaxed if there are no signal wires in the window that carry the designated ratio of the current limit. The ratio may be supplied by the foundry based on the technology in which the integrated circuit is to be fabricated.

The EM checker tool may be configured to combine the first and second relaxation amounts (if applicable) and the unadjusted current limit to generate an adjusted current limit (block 54), and may compare the adjusted current limit to the current in the potentially-failing power supply wire. If the potentially-failing power wire still fails the check against the adjusted current limit (decision block 56, "yes" leg), the power supply wire may be flagged for the designer to correct (block 58). If the potentially-failing power supply wire does not fail the check (decision block 56, "no" leg), the power supply wire does not require correction (block 60). Each potentially-failing power supply wire that is eliminated (decision block 56, "no" leg) may reduce the amount of work the designer performs for electromigration/Joule heating corrections in an embodiment. Additionally, performance and area impacts for unnecessary corrections may be eliminated, in an embodiment. The set of flagged wires may be output (e.g. in a file or other form that may be analyzed by the designer later) so that the designer may review the wires and provide the corrections to pass the EM checks (block 62).

Figure 3:
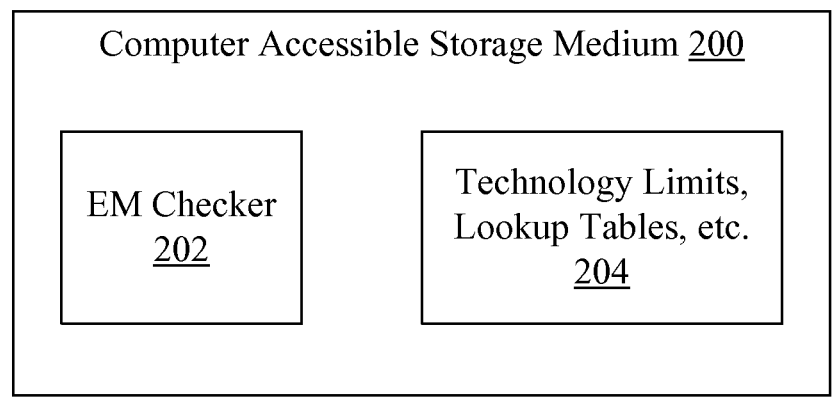
FIG. 3 is a block diagram of one embodiment of a computer accessible storage medium.

FIG. 3 is a block diagram of one embodiment of a computer accessible storage medium 200. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 3 may store code forming the EM checker tool 202. The computer accessible storage medium 200 may still further store one or more data structures such as files specifying the technology current limits, lookup tables of relaxation limits, other relaxation amounts, etc. (block 204). In some embodiments, the computer accessible storage medium 200 may also store various design descriptions of an integrated circuit design to be checked by the EM checker (e.g. hardware description language (HDL) descriptions, circuit schematic descriptions, net lists, layout files, etc.). The EM checker tool 202 may each include instructions which, when executed, implement the operation described for the EM checker tool above. For example, the method illustrated in FIGS. 1 and/or 2 may be embodied the EM checker tool 202 and may be executed by one or more processors of a computer system such as the system shown in FIG. 4. A carrier medium may include computer accessible storage media as well as transmission media such as wired or wireless transmission.

Figure 4:
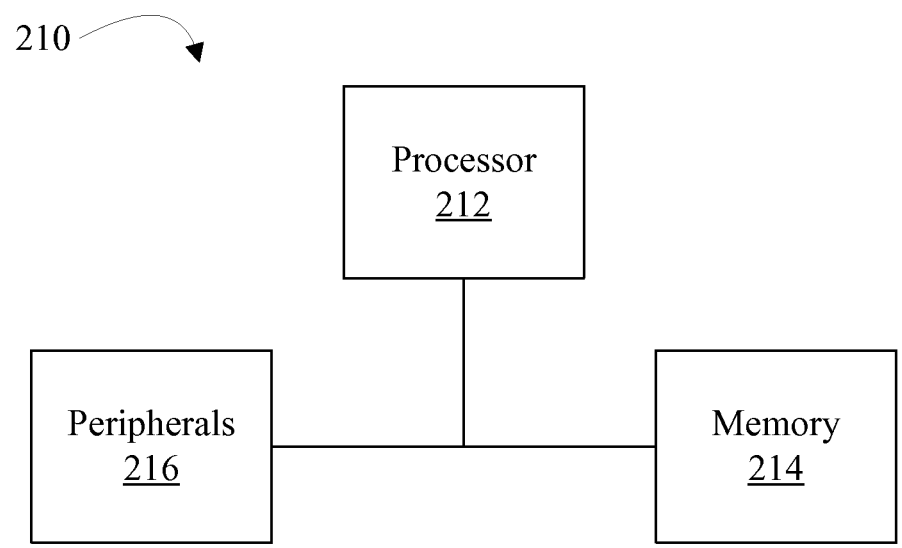
FIG. 4 is a block diagram of one embodiment of a computer system.

FIG. 4 is a block diagram of one embodiment of an exemplary computer system 210. In the embodiment of FIG. 4, the computer system 210 includes a processor 212, a memory 214, and various peripheral devices 216. The processor 212 is coupled to the memory 214 and the peripheral devices 216.

The processor 212 is configured to execute instructions, including the instructions in the software described herein such as the EM checker tool 202. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridge chips may be used to couple the processor 212, the memory 214, and the peripheral devices 216.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use, data to be operated upon by the processor 212 during use, etc.

Peripheral devices 216 may represent any sort of hardware devices that may be included in the computer system 210 or coupled thereto (e.g. storage devices, optionally including a computer accessible storage medium 200, other input/output (I/O) devices such as video hardware, audio hardware, user interface devices, networking hardware, etc.).

Numerous variations and modifications will become apparent to those skilled in the art once the above disclosure is fully appreciated. It is intended that the following claims be interpreted to embrace all such variations and modifications.

What is claimed is:

1. A non-transitory computer accessible storage medium storing a plurality of instructions that, when executed by one or more processors in a computer system, cause the one or more processors to:

(a) identify a plurality of potentially-failing wires in a circuit design according to a specified current limit, wherein the plurality of potentially-failing wires exclude one or more wires in the circuit design that meet the specified current limit;

(b) for a given wire of the plurality of potentially-failing wires, examine wires within a window of a predetermined size around the given wire according to one or more criteria indicating electromigration or Joule heating contribution to the given wire;

(c) determine a second current limit for the given wire responsive to examining the wires within the window, wherein the second current limit is greater than or equal to the specified current limit dependent upon a result of examining the wires within the window;

(d) eliminate the given wire from the plurality of potentially-failing wires responsive to a current in the given wire meeting the second current limit; and repeat (b), (c), and (d) for each other wire of the plurality of potentially-failing wires.

2. The computer accessible storage medium as recited in claim 1 wherein the given wire is a signal wire and the one or more criteria include non-minimum spacing of adjacent wires to the given wire.

3. The computer accessible storage medium as recited in claim 1 wherein the given wire is a signal wire and the one or more criteria include whether or not a power supply wire is within the window.

4. The computer accessible storage medium as recited in claim 1 wherein the given wire is a signal wire and the one or more criteria include a number of signal wires in the window each carrying a current that exceeds a ratio of the specified current limit.

5. The computer accessible storage medium as recited in claim 1 wherein the given wire is a power supply wire and the one or more criteria include a number of signal wires in the window each carrying a current that exceeds a ratio of the specified current limit.

6. The computer accessible storage medium as recited in claim 1 wherein the plurality of instructions, when executed, cause the one or more processors to identify remaining ones of the plurality of potentially-failing wires after the eliminating as failing wires to be corrected by a design change.

7. The computer accessible storage medium as recited in claim 1 wherein the predetermined size is set based on Joule heating dissipation.

8. A computer system comprising:

one or more processors; and a non-transitory computer accessible storage medium storing a plurality of instructions that, when executed by the one or more processors, cause the one or more processors to perform a method comprising:

identifying a plurality of potentially-failing wires in a circuit design according to a specified current limit, wherein the plurality of potentially-failing wires exclude one or more wires in the circuit design that meet the specified current limit;

for a given wire of the plurality of potentially-failing wires, examining wires within a window of a predetermined size around the given wire according to one or more criteria indicating electromigration or Joule heating contribution to the given wire;

determining a second current limit for the given wire responsive to examining the wires within the window, wherein the second current limit is greater than or equal to the specified current limit dependent upon a result of examining the wires within the window;

eliminating the given wire from the plurality of potentially-failing wires responsive to a current in the given wire meeting the second current limit; and repeat the examining, the determining, and the eliminating for each other wire of the plurality of potentially-failing wires.

9. The computer system as recited in claim 8 wherein the given wire is a signal wire and the one or more criteria include non-minimum spacing of adjacent wires to the given wire.

10. The computer system as recited in claim 8 wherein the given wire is a signal wire and the one or more criteria include whether or not a power supply wire is within the window.

11. The computer system as recited in claim 8 wherein the given wire is a signal wire and the one or more criteria include a number of signal wires in the window each carrying a current that exceeds a ratio of the specified current limit.

12. The computer system as recited in claim 8 wherein the given wire is a power supply wire and the one or more criteria include a number of signal wires in the window each carrying a current that exceeds a ratio of the specified current limit.

13. The computer system as recited in claim 8 wherein the method further comprises identifying remaining ones of the plurality of potentially-failing wires after the eliminating as failing wires to be corrected by a design change.

14. The computer system as recited in claim 8 wherein the predetermined size is set based on Joule heating dissipation.

15. A non-transitory computer accessible storage medium storing a plurality of instructions that, when executed by one or more processors in a computer system, cause the one or more processors to:

(a) identify a plurality of wires in a circuit design that exceed a specified current limit, wherein the plurality of wires exclude one or more wires in the circuit design that meet the specified current limit;

(b) for a given wire of the plurality of wires, examine wires within a window of a predetermined size around the given wire according to one or more criteria indicating electromigration or Joule heating contribution to the given wire;

(c) determine a second current limit for the given wire responsive to examining the wires within the window, wherein the second current limit is greater than or equal to the specified current limit dependent upon a result of examining the wires within the window;

(d) eliminate the given wire from the plurality of wires responsive to a current in the given wire meeting the second current limit;

(e) repeat (b), (c), and (d) for each other wire of the plurality of potentially-failing wires; and (f) present remaining wires of the plurality of wires after (e) to be corrected in the circuit design.

16. The computer accessible storage medium as recited in claim 15 wherein the given wire is a signal wire and the one or more criteria include non-minimum spacing of adjacent wires to the given wire.

17. The computer accessible storage medium as recited in claim 15 wherein the given wire is a signal wire and the one or more criteria include whether or not a power supply wire is within the window.

18. The computer accessible storage medium as recited in claim 15 wherein the given wire is a signal wire and the one or more criteria include a number of signal wires in the window each carrying a current that exceeds a ratio of the specified current limit.

19. The computer accessible storage medium as recited in claim 15 wherein the given wire is a power supply wire and the one or more criteria include a number of signal wires in the window each carrying a current that exceeds a ratio of the specified current limit.

20. The computer accessible storage medium as recited in claim 15 wherein the predetermined size is set based on Joule heating dissipation.

* * * * *